United States Patent [19]

Appleton et al.

[11] 3,928,672

[45] Dec. 23, 1975

[54] PROCESS FOR PROVIDING A HARD COATING TO MAGNETIC TRANSDUCING HEADS

[75] Inventors: Thomas R. Appleton, Afton; Richard H. Dean, Bloomington; Edward J. Hillman, Minneapolis; Charles J. Nelson, Rosemount; Gunter E. Sinn, Inver Grove Heights, all of Minn.

[73] Assignee: Sperry Rand Corporation, New York, N.Y.

[22] Filed: Apr. 14, 1972

[21] Appl. No.: 244,301

Related U.S. Application Data

[62] Division of Ser. No. 38,423, May 18, 1970, abandoned.

[52] U.S. Cl. ................ 427/127; 427/248; 427/279; 427/282; 427/295; 427/300; 427/330

[51] Int. Cl.$^2$ ........................................ G11B 21/00

[58] Field of Search ............ 117/234, 119, 48, 107, 117/93.3; 118/48–49.5; 340/174.1 F; 179/100.2 C, 100.2 CA, 100.2 CB, 100.2 CF, 100.2 CH; 427/127–132, 300, 330

[56] References Cited

UNITED STATES PATENTS

| | | | |
|---|---|---|---|
| 2,866,011 | 12/1958 | Kornei | 179/100 |
| 2,898,230 | 8/1959 | Bulloff | 117/119 X |
| 2,991,511 | 7/1961 | Kornei | 118/59 |
| 3,012,904 | 12/1961 | Baer et al. | 117/119 X |
| 3,109,749 | 11/1963 | DiRicco | 179/100.2 |
| 3,335,412 | 8/1967 | Matsumoto | 340/174.1 |
| 3,417,386 | 12/1968 | Schneider | 340/174.1 |
| 3,551,202 | 7/1969 | Wright et al. | 179/100.2 |
| 3,566,045 | 2/1971 | Paine | 179/100.2 |
| 3,651,781 | 3/1972 | Brill | 118/7 |
| 3,693,583 | 9/1972 | Vanderschueren | 118/49.5 |

OTHER PUBLICATIONS

IBM T.D.B., Vol. 7, No. 4, Sept. 1964, p. 333.

IBM T.D.B., Vol. 4, No. 11, Apr. 1962, p. 24.

*Primary Examiner*—Bernard D. Pianalto
*Attorney, Agent, or Firm*—Kenneth T. Grace; Thomas J. Nikolai; Marshall M. Truex

[57] ABSTRACT

A method of increasing the normal life of a contact type magnetic transducing head by applying a hard coating of silicon monoxide to that portion of the surface of the head that comes in contact with the magnetic tape.

5 Claims, 2 Drawing Figures

INVENTORS
THOMAS R. APPLETON
RICHARD H. DEAN
EDWARD J. HILLMAN
CHARLES J. NELSON
GUNTER E. SINN
BY Thomas J. Nikolai
ATTORNEY

PROCESS FOR PROVIDING A HARD COATING TO MAGNETIC TRANSDUCING HEADS

CROSS-REFERENCE TO RELATED APPLICATION

The present application is a divisional application of our parent application Ser. No. 38,423 filed May 18, 1970, now abandoned.

BACKGROUND OF THE INVENTION

Prior art read/record heads used in magnetic tape recording and reproducing equipment are plagued with problems occasioned by erosion or wear resulting from the abrasive action of the magnetic tape as it passes over the head surface. This erosion is believed to be caused by two factors, namely the oxide coating on the magnetic tape and the bonding agent used to secure the oxide coating to the tape base material. As the tape moves by the transducing head, the profile of the head is gradually ground down, thus affecting the electrical signals recorded or reproduced from the tape. The erosion of the heads causes a constant maintenance problem, and, ultimately, the head must be removed from the magnetic system and reworked or in many instances scrapped.

The present invention involves a method for providing the surface area of a transducing head that comes in contact with the tape with a highly abrasion resistant coating of silicon monoxide to thereby extend the useful life of the transducing head as well as the life of the magnetic tape used therewith.

In carrying out this invention, the head surface to be treated is first cleaned and following this cleaning operation, the head is disposed in a vacuum deposition chamber and subjected to an elevated temperature and a vacuum for a period of time sufficient to effect a substantial outgassing of the contaminants from the magnetic head. Following this outgassing step, the part of the transducing head which comes in contact with the magnetic tape is coated in a vacuum deposition process with silicon monoxide to a predetermined thickness. It is this coating of silicon monoxide the provides an extremely hard abrasion resistant surface on the head.

Accordingly, it is the principle object of the present invention to provide a novel magnetic transducing head having superior wear resistant properties than known prior art transducing heads.

It is another object of this invention to provide a novel method or process for treating magnetic transducing heads to thereby extend the useful life thereof.

DESCRIPTION OF THE DRAWINGS

Other objects and advantages of the invention will become apparent from the following description taken in conjunction with the accompanying drawings in which.

DESCRIPTION OF THE PREFERRED EMBODIMENT

Figures 1, 2:
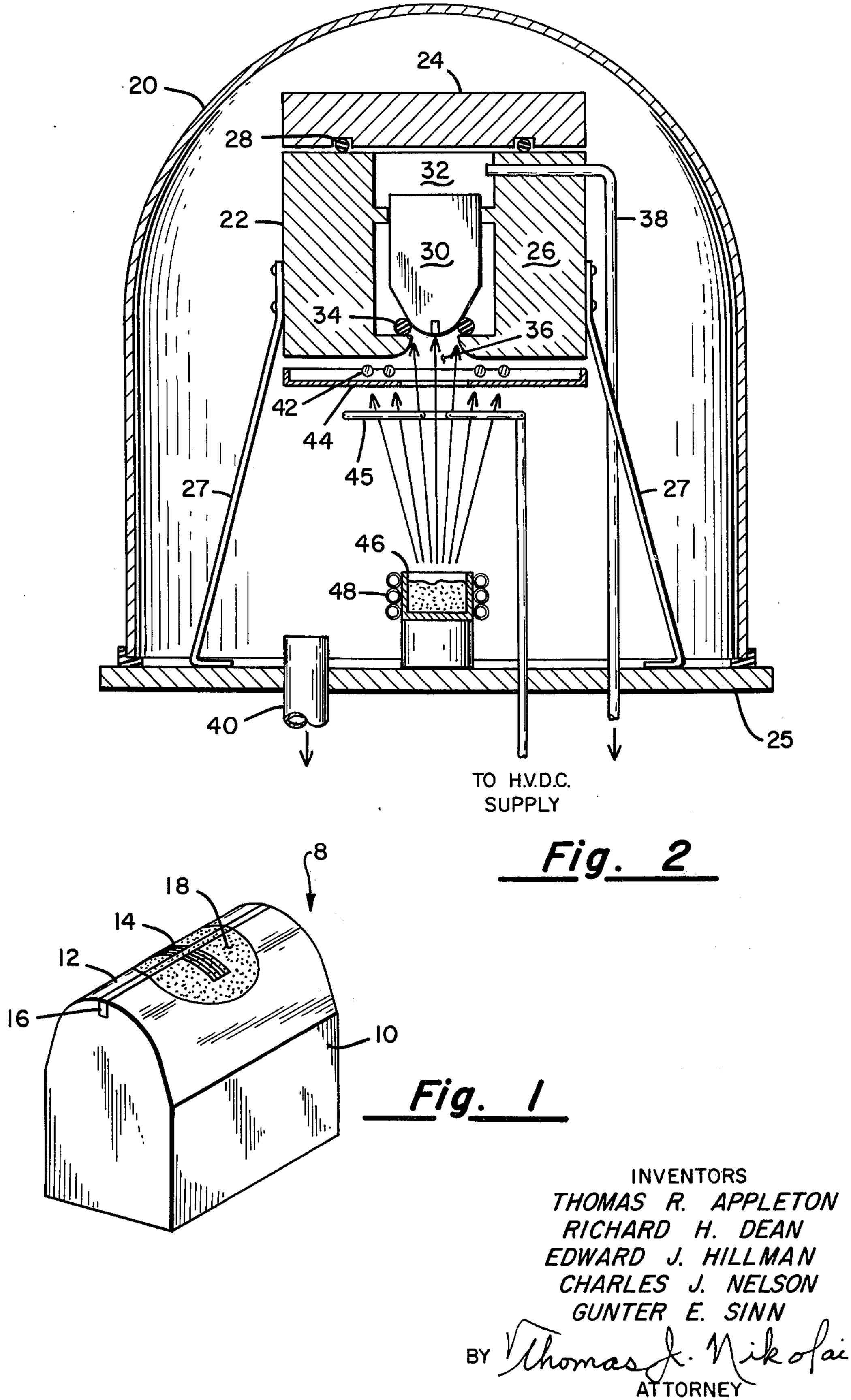
FIG. 1 is a pictorial view of a typical transducing head treated in accordance with the process of this invention.
FIG. 2 illustrates schematically a typical apparatus in which a process of this invention can be accomplished.

Referring now to FIG. 1, there is shown a read/record head 8 of the type used in magnetic tape recording and reproducing equipment. The head comprises a block 10 of nonmagnetic material having a portion thereof tapered at a predetermined angle and terminating in a cylindrical surface of small radius 12. Located within the block 10 are one or more laminated magnetic core elements 14 having a pair of pole pieces separated by a gap 16, the pole pieces conforming to the shape of the block.

In operation, the magnetic tape is fed to and from the head at an appropriate angle such that the normal tape tension provided by the tape's driving mechanism (not shown) is sufficient to maintain the tape in positive contact with the active surface of the head occupied by the pole pieces 14. The magnetic tape used in conventional recording/reproducing equipment consists of a plastic backing material having a magnetic oxide secured thereto by a suitable binder. It is found in practice that this oxide and binder material are quite abrasive. Accordingly, after a period of use, the head 8 is eroded in the area of contact between the tape and the cylindrical surface 12 and this produces a noticeable effect on the signals being recorded on and read back from the tape.

In order to extend the useful life of the magnetic head 8, there is provided by this invention a thin coating of silicon monoxide 18 which is deposited upon the surface of the head 8 that comes into contact with the magnetic tape when the head is in its normal operating position in the tape handling system. Because of the hard, nonabrasive qualities of the silicon monoxide, the problem of erosion is substantially minimized.

Referring next to FIG. 2, the apparatus employed in carrying out the process of this invention will be described.

Located within a first evacuable chamber 20 is a second evacuable chamber 22. The chamber 22 is defined by an upper cover member 24 and a lower hollow cylindrical member 26 which is secured to a base plate 25 by support members 27. A suitable seal such as the O-ring 28 is disposed between the upper member 24 and the lower member 26 to effect a seal therebetween.

The head 30 to be treated along with its associated cables (not shown) is inserted within the chamber 32 defined by the upper and lower members 24 and 26. Another O-ring seal 34 is positioned between the head 30 and the aperture 36 formed in the bottom of member 26 for exposing to chamber 20 only that surface of head 30 that is to be treated by the thin coating of silicon monoxide 18. A vacuum line 38 communicates with the chamber 32 and passes through the base plate 25 and connects to a suitable vacuum pump (not shown) located outside of the vacuum chamber 200 Similarly, a vacuum line 40 communicates with the chamber 20 and connects to a second vacuum pump located external to the chamber 20. Because of the O-ring seals and the separate vacuum lines 38 and 40, it is possible to evacuate the chamber 32 without having foreign particles and contaminates outgassed from the chamber 32 contaminating the chamber 20.

A suitable heater 42, here shown as an electrical coil, is positioned in close proximity to the head 30 to be treated so that the head can be subjected to an elevated temperature. A reflector/shield 44 directs the heat energy from the element 42 to be focused on the head 30.

Positioned directly beneath the aperture 36 in member 26 is an ion scrubbing electrode. This electrode comprises a split ring which is mounted on the upper end of a supporting rod. The supporting rod passes through an insulating feed-through in the base plate 25 and is connected to one side of a high voltage direct current power supply (not shown). The other terminal of the supply is connected to the head 30. When the pressure within the chamber 20 is reduced to around $10^{-2}$ Torr, ionization of the remaining gas takes place and these ions bombard the exposed portion of head 30 to further clean and prepare its surface for the subsequently deposited film.

Located directly beneath the aperture 36 in the member 26 is a crucible 46 which is adapted to be heated by a high frequency current passing through the coils 48 of an induction heater. A silicon monoxide compound is located within the crucible 46.

Now that the apparatus used in carrying out the method of this invention has been described in detail, consideration will be given to the steps of the process itself.

The first step in the process is the prepare the head surface to be coated by cleaning. The head assembly is first dipped into a chromic acid solution to remove organic materials from the head. Next, it is then thoroughly washed in distilled water.

The second step in the process is to unfasten the upper cover 24 of chamber 22 from the lower fixture 26 and to place a head 30 to be treated within the chamber 32 so that the surface of the head to be treated is in intimate contact with the O-ring seal 34. Once the head is tightly clamped in this position, the upper removable cover 24 is again secured to the lower fixture 26 with the O-ring 28 in place and acting as a seal for the chamber 32.

With the head in place in the vacuum system, the chambers 20 and 32 are partially evacuated to a pressure in the range of $5 \times 10^{-2}$ to $15 \times 10^{-2}$ Torr. Next, a relatively high potential of around 25,000 volts is applied between the head 30 and the scrubbing electrode 45. With this low pressure breakdown occurs and the head is bombarded with ions. This ion scrubbing step is allowed to continue for a period of about one-half hour and serves to further clean and prepare the head surface for the deposition phase to follow.

Next, the pressure in chambers 20 and 32 is decreased to approximately $10^{-6}$ Torr. After the pressure in chambers 20 and 32 has been reduced to the desired value, the heater 42 is energized for a period ranging from 3 to 16 hours so that a temperature of approximately 70° to 80° Centigrade is attained and held for this time. This high temperature causes outgassing of the surface of the head, thereby removing contamination such as water vapor, oxygen and other organic materials like solvents which may still be on the surface area of the head which is exposed through the aperture 36. Because of the fact that the majority of the area of the head is contained within the chamber 32 which is separately evacuated, the contaminants and other materials outgass during this step from the major portion of the head assembly do not foul the chamber 20.

Following the outgassing step described above, the radio frequency coil 48 is energized to heat the crucible 14 and its contents to a temperature which causes the silicon monoxide compound to sublimate. The resulting vapors pass through the aperture in the reflector shield 44 and the aperture 36 in the lower member 26 to condense on and coat a predetermined portion of the surface of head 30. After the silicon monoxide has been deposited on the head to a thickness in the range from 10,000 to 35,000 Angstroms, the heating coil 48 is de-energized and the head assembly 30 is permitted to cool. (It has proved convenient to employ a conventional crystal thickness monitoring gauge in the system to measure the thicknesss of the deposited film). Subsequently, the vacuum to the chambers 20 and 32 is broken and the head assembly with its silicon monoxide coating is removed from the apparatus.

While a number of alternatives are available in the constuction of the apparatus used to carry out the process, there has been shown the preferred embodiment of this apparatus. Accordingly, the scope of this invention is to be determined by the appended claims.

What is claimed is:

1. A method of treating a magnetic transducing head to extend the useful life of said head comprising the steps of:

a. cleaning the surface of the transducing head that is to be treated;
b. loading said head in a first evacuable chamber and positioning said first evacuable chamber within a second evacuable chamber for exposing only said surface of said head that is to be treated to said second evacuable chamber;
c. applying first and second vacuums from separate vacuum sources to said first and second evacuable chambers for preventing contaminants from passing from said first evacuable chamber into said second evacuable chamber;
d. generating a silicon monoxide evaporant within said second evacuable chamber but not within said first evacuable chamber; and,
e. directing said evaporant onto said surface of said head that is to be treated to form a deposit of silicon monoxide thereon of a predetermined thickness.

2. The process as in claim 1 wherein said second chamber is evacuated to a pressure of approximately $10^{-6}$ Torr.

3. The method as in claim 1 wherein said cleaning step comprises:

a. dipping said head into a chromic acid solution,
b. rinsing said head in distilled water,
c. drying in air,
d. bombarding a portion of said heat with ions for a predetermined period of time.

4. A method of treating a magnetic transducing head to extend the useful life of said head comprising the steps of:

a. cleaning the surface of the transducing head that is to be treated;
b. loading said head in a first evacuable chamber and positioning said first evacuable chamber within a second evacuable chamber for exposing only said surface of said head that is to be treated to said second evacuable chamber;
c. applying first and second vacuums for separate vacuum sources to said first and second evacuable chambers for preventing contaminants from passing from said first evacuable chamber into said second evacuable chamber;
d. locating a silicon monoxide compound within said second evacuable chamber; and,
e. depositing said silicon monoxide compound only upon said surface of said head that is to be treated to form a deposit of silicon monoxide thereon of a predetermined thickness.

5. The method as in claim 4 wherein said cleaning step comprises:

a. dipping said head into a chromic acid solution;
b. rinsing said head in distilled water;
c. drying in air;
d. bombarding a portion of said head with ions from said second evacuable chamber for a predetermined period of time while said head is loaded in said first evacuable chamber.

* * * * *

UNITED STATES PATENT OFFICE

CERTIFICATE OF CORRECTION

PATENT NO. : 3,928,672

DATED : December 23, 1975

INVENTOR(S) : Thomas R. Appleton, et al

It is certified that error appears in the above-identified patent and that said Letters Patent are hereby corrected as shown below:

IN THE PRINTED PATENT

Column 4, Line 44, "heat" should be -- head --.

Column 4, Line 56, "for" should be -- from --.

Signed and Sealed this

*sixteenth* Day of *March 1976*

[SEAL]

*Attest:*

RUTH C. MASON
*Attesting Officer*

C. MARSHALL DANN
*Commissioner of Patents and Trademarks*